United States Patent [19]

Gyi et al.

[11] 4,164,767

[45] Aug. 14, 1979

[54] MASS STORAGE DEVICE

[75] Inventors: Ko K. Gyi; Herbert U. Ragle, both of Thousand Oaks, Calif.

[73] Assignee: Burroughs Corporation, Detroit, Mich.

[21] Appl. No.: 864,149

[22] Filed: Dec. 23, 1977

Related U.S. Application Data

[63] Continuation-in-part of Ser. No. 774,312, Mar. 4, 1977, Pat. No. 4,118,746.

[51] Int. Cl.$^2$ .................. G11B 5/012; G11B 5/54; G11B 17/00; G11B 21/08
[52] U.S. Cl. ........................................ 360/98; 360/99; 360/105
[58] Field of Search .................... 360/97–99, 360/133, 135, 105, 106, 109; 346/137

[56] References Cited

U.S. PATENT DOCUMENTS

| | | | |
|---|---|---|---|
| 3,484,760 | 12/1969 | Perkins et al. | 360/98 |
| 3,703,713 | 11/1972 | Pohm et al. | 360/99 |
| 3,864,747 | 2/1975 | Pejcha | 360/98 |
| 3,864,750 | 2/1975 | Applequist | 360/98 |
| 4,011,590 | 3/1977 | Orlando | 360/98 |
| 4,019,204 | 4/1977 | Griffiths et al. | 360/99 |
| 4,030,136 | 6/1977 | Smith et al. | 360/98 |

OTHER PUBLICATIONS

IBM Tech. Disc. Bull., G. D. Herring et al., Adjustable Flexible Disk Pack Assembly, vol. 17, No. 6, Nov. 1974, pp. 1710–1711.

Primary Examiner—Alfred H. Eddleman
Attorney, Agent, or Firm—John J. McCormack; Nathan Cass; Kevin R. Peterson

[57] ABSTRACT

Shown and described are paired floppy-disk memory modules advantageously interlaced together and coupled to a CPU to provide a direct-access Mass Store Memory capability, each module comprising a pair of "short-stack" floppy disk files and an associated pair of transducer-actuator assemblies "shared" by the files.

2 Claims, 6 Drawing Figures

MASS STORAGE DEVICE

CROSS REFERENCE TO RELATED APPLICATIONS

This case is a continuation-in-part of U.S. Ser. No. 774,312, filed Mar. 4, 1977 for "High Performance Floppy Pack and Associated System", now U.S. Pat. No. 4,118,746, in the U.S. Patent and Trademark Office by the same inventors and commonly assigned. U.S. Ser. No. 774,312 is herewith incorporated herein by reference.

BACKGROUND, FEATURES OF INVENTION

The subject invention relates to magnetic recording systems and particularly to improved techniques and arrangements for interrelating transducer-actuators with disk stacks.

Workers in arts involving the design, manufacture and/or use of magnetic recording systems will recognize the need for improved techniques and associated apparatus for more efficient, more accurate data storage/read-out functions. One particular need—evermore demanding—is for a "mass store" system adapted for automatic data processing. This invention is intended to provide an improved mass store system of this type; one making better, more efficient use of recording surfaces and of associated transducer access means.

Prior art approaches:

Workers will recognize that various types of storage media have long been considered for "mass store"; such as "surface deformation" media; "photo-recording" media and magnetic recording media. One form of photo-recording mass store system involved a so-called "trillion bit photo digital" system. Here, recording was photographic, on a silver halide film dispersed upon a rigid glass carrier. After exposing and processing, these film-carriers were stored near a Read-station and pneumatically transported to the station when called-up.

However, magnetic recording media are now preferred for various reasons; for instance, they are updated very easily and conveniently. Magnetic recording media is either "rigid" (disks or drums) or flexible—the latter, including "floppy disks" and magnetic tape (strip, reel, loop, etc.), are usually preferred because of their aptness for efficient, low-cost, high-capacity storage.

Now, as workers well know, adapting flexible magnetic recording media for mass storage can conceiveably involve either a large pack of flexible disks (e.g., advantageous for random access manipulation) or tape—either in reel, cartridge or strip form, or as a continuous loop. Workers also recognize that transducing may be performed along such media in either a longitudinal or a "rotary" transducing mode. Disks are typically accessed by a moving-arm transducer mechanism; whereas tape is accessed by (one or several), transport mechanisms. The present invention is intended to implement mass store systems with flexible magnetic recording media.

Other flexible magnetic media:

Workers will recall various other flexible-media approaches suggested for data storage. For instance, one concept involved "Data Cells" comprising longitudinal magnetic recording strips having data capacities on the order of several billion bytes, or more and using thick magnetic strips, (e.g., a few inches by about a foot by a foot by a few mils) on which data was to be longitudinally recorded. The Data Cells were modular; with several cell drives being under the aegis of a common control unit. Access times as short as several hundred milliseconds were projected.

Another concept involved flexible spooled-cartridges (see "Magnetic Recording Storage" by Hoagland in IEEE Computer Transactions of December 1976). These cartridges were to be transported from a "storage-honeycomb" to Read/Write stations where "rotary-head" transducing was postulated. This flexible medium was chosen to maximize "volumetric-density" (information stored per unit volume of the apparatus)—the cost alone of rigid media being prohibitive by comparison.

Another flexible media approach involved the use of flexible magnetic recording disks, arranged as a "cluster" of disks packs adapted to be accessed by a single common transducer mechanism. (See U.S. Pat. No. 3,703,713 to Pohm and Zingg issued Nov. 21, 1972). A very large rather slow and ponderous "archival" type storage memory was contemplated here (capacity of $10^{12}$ bits). In each pack the disks were subdivided into groups; the disks in each group all had different, increasing diameters. These disks were to be mechanically partitioned, from without, by a knife-like transducer arm which mechanically diverted adjacent disks from the "target disk" (surface)—though such physical contact is well recognized as highly undesireable. In a specific embodiment contemplated, eight cylindrical packs each four feet long were proposed for access by a single, centrally-located mechanism. This invention contemplates an improved mass storage system comprised of flexible disk packs which are arranged in short paired stacks arranged to share an associated pair of transducer actuator devices.

Conventional "mass-store" architecture:

Workers will recognize that an optimal "mass store" system (MSS) will provide memory capability for handling all data at a given user-establishment in a fully automated manner. The key to cost-effective implementation is to provide a low-cost, high-capacity mass storage memory (MSM) which is CPU accessed very quickly. Also, it should be effectively integrated with any other related memory stages, such as archival memory, direct-access memory and "working" memory—in effect vastly expanding D-A memory. The present invention is intended to provide this in a novel mass store system and related subsystems.

A typical present-day mass storage system (e.g., massive tape file) operates too slowly and inefficiently; being characterized by manual intervention and/or staging-destaging indirect (buffered) CP access and associated high storage/access costs and slow access. For instance, when the processor of a typical system requests a "data set" which is not stored in the system's D-A memory, (typically a disk file), an operator must be instructed, via a SPO (i.e., a "Simultaneous Peripheral Operation"; e.g., on a high-priority operator terminal), to fetch the tape reel containing this data-set from his tape library; then the operator must mount this reel on a tape transport and "stage" it into the direct-access memory (e.g., rigid-disk file) of the MSS. Further, if the data-set is to be modified, it must be "de-staged" to tape for library-return. Such systems are, of course, rife with manual intervention and much too slow—averaging only about 10 reel-mountings per hour per tape transport—a rate which is intolerably slow and unrealistically crude compared with what can be achieved by automation, as workers know. Such automation has been proposed (e.g., see Hoagland art above and; Harris "Mass Store System" IEEE Proc. 8/75). One proposed tape system is characterized by the equivalent of about 146 reel-mountings per hour for staging average-sized data sets. There is no way that such a plethora of tape cartridges can be efficiently handled manually.

According to this invention this problem is attacked with flexible disk packs, rather than tape. For instance, in a system of the type described in the preferred embodiment below, access to an average data-set is feasible at the rate of about 600 to 700 mountings per hour—being characterized by faster disk-accessing as well as cost advantages, with a speed/cost ratio which is very, very significant. [E.g., assume that it costs about $3.00 to store one reel for one year and about $2.50, and several minutes for each mounting or de-mounting vs. a fraction of a second for comparable disk-access. Here, direct access alone by eliminating staging/destaging can save close to one second].

It will be understood that the architectural scheme 1. indicated in FIG. 3 is intended to present a data record from MSM to a readily useable "data block path" R, adjacent a "working memory unit". Such a call-up (path) is completely impractical in tape systems of the type described, whereas in disk systems like those proposed, it is quite feasible because of the associated shorter data access time.

This invention addresses the foregoing problems in a new way, teaching the provision of a MS system with pairs of relatively short compact stacks of "floppy disks", each pair of stacks preferably having its own shared pair of actuator assemblies—this in a fast-access, direct-access MS Memory directly and automatically linked to an automatic data processing system, including other memory, without "staging" or like intervention. The low cost, compactness, and fast-access of such floppy disk modules will be seen as providing improved MS Memory with capacities of several dozen BB (billion bytes) and more.

BRIEF DESCRIPTION OF THE DRAWINGS

These and other features and advantages of the present invention will be appreciated by workers as they become better understood by reference to the following detailed description of presently preferred embodiments, these being preferably considered in conjunction with the accompanying drawings, wherein like reference symbols denote like elements.

Figure 2:
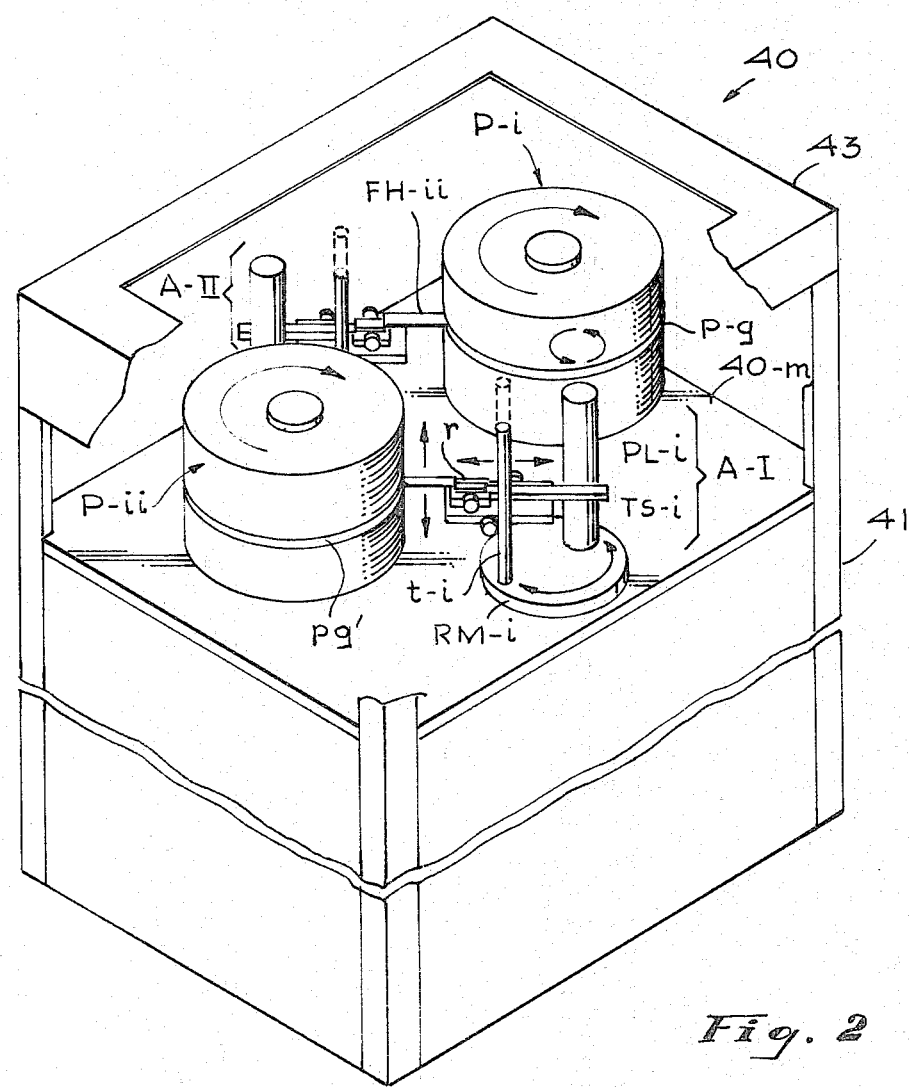
FIG. 2 is an upper isometric elevation of a preferred "paired-stack/shared actuator" mass memory embodiment; each stack being preferably constructed like the embodiment of FIG. 1.
Figure 3:
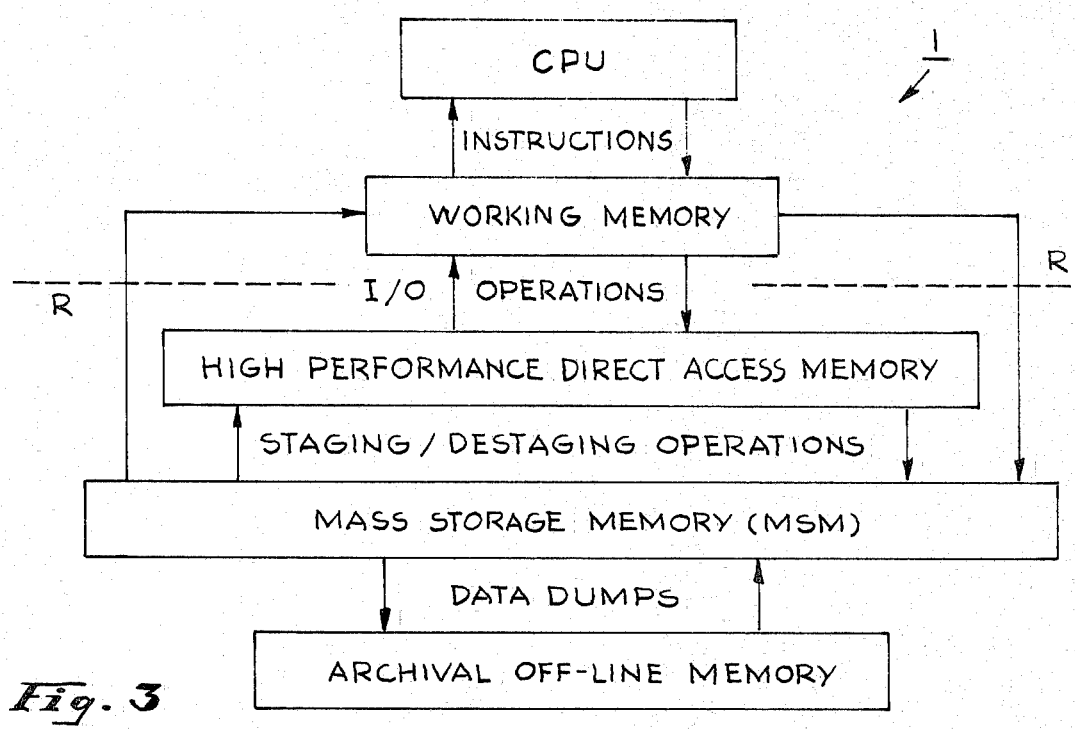
FIG. 3 is a schematic diagram indicating a relatively conventional flow of data between a CPU and memory units.

Preferred Mass Store Device (FIG. 2):

FIG. 2 indicates a preferred embodiment 40 of a flexible disk mass storage unit. Unit 40 comprises an associated pair of removeable data modules (flexible disk packs) P-i, P-ii, each mounted to be rotatably driven at relatively high speed, as known in the art. This will be recognized as a schematic, rather generalized functional showing of a pair of flexible disk packs, each mounted conventionally (on turntables, etc.) and operatively engaged with "partitioning" means (preferably an inner hub adapted to pneumatically split the pack) for affording entry access by a conventional transducer mount TR, as generally understood in the art. Here, and elsewhere, the materials, mechanisms and systems alluded to should be understood as conventionally constructed and operated as presently known in the art, except where otherwise mentioned.

Accordingly, the pair of floppy disk packs P will be understood to be conventionally engaged by a rotation assembly for prescribed high speed rotation (the "high performance" systems like those described will be understood to involve rotation of at least several hundred disks at several thousand rpm or faster—preferably by a common motive means). The rotation assembly comprises conventional means, as does each transducer assembly and associated (X-Y) transducer actuator, as well understood in the art.

Once a pack is so engaged, and so rotated it is ready for transducer operations on a selected disk, access to which is best facilitated by a "partitioning", i.e., a separation between disks sufficient to expose the selected disk surface, (at least partly) so as to accommodate entry of the transducer mount. Here, and elsewhere, it will be indicated that flexible disk packs like those described, are particularly apt for "pneumatic" partitioning from a central ("hub") partitioning means as known in the art.

This and other magnetic recording means and associated means discussed herein will generally be understood as constructed and operating as presently known in the art except where otherwise specified. Such an arrangement of flexible disk packs and associated rotating means and transducers and transducer access and related control means will be recognized as relatively conventional except where specified to the contrary. The flexible recording disks will be understood as relatively conventional, being preferably about one foot in diameter and formed of a non-magnetic substrate, coated with a thin magnetic recording medium applied to at least one disk face.

A pair of like transducer access mechanisms A-I, A-II are arranged to service either (one or both) of the data modules P-i, P-ii, as desired—i.e., be "shared", according to a feature hereof. Each such actuator unit is conventionally constructed and operated as known in the art, but preferably with modifications as described below. Thus, each actuator unit A includes a respective flying head or transducer assembly FH (mounting one or several Read/Write cores on an actuator arm) and associated lateral transport mechanism (r) adapted to transport the transducer head into and out of the pack confines, as known in the art and as indicated by the arrows.

It will also be understood that such transducers will be assumed to preferably comprise the "flying head" type of transducer heretofore regularly used with rigid magnetic recording disks. It has been found that stacks of 1.5 mil flexible disks separated by suitable spacers (about 6 mil, radially-permeable spacers) can readily be separated by pneumatic means from the "pack's hub area" sufficient to insert such a flying head. Such heads can conventionally read and write several thousand bits per inch-track, flying about one to several dozen microinches above a flexible disk surface.

Each track-select transport mechanism (r) is cantilevered out on an associated transport arm mounted between a pair of supporting pillers PL-i, T-i, and adapted to carry the carriage on which the flying head assembly FH is supported for reciprocation thereof relative to this arm, and radially of a pack, as known in the art. The transport arm is, in turn, mounted for selective vertical reciprocation (by means not shown, but well known in the art) on support pillar PL-i, while companion pillar T-i is provided for more stable, two-point, support. Supporting pillars P, T are, in turn, projected up from a pivotable disk support RM, each adapted to swing (as indicated in the arrows) so as to present its respective flying head assembly FH for insertion into either of the data modules P—according to a feature of novelty.

It will be apparent that, according to this feature, either or both actuator mechanisms, A-I, A-II may be used to service either data module P-i, P-ii; or both may service a single data module! The data modules P and the access mechanisms A are mounted at convenient operator servicing height, within cabinet 41, upon a mounting platform 40-M and adapted to be enclosed under a removeable transparent dust hood 43. Workers will recognize that such a "sharing" of a pair of actuators by a pair of disk packs is advantageous in several respects, especially because it can radically reduce access time. Also, it can accommodate simultaneous multiple (parallel) access to any single stack, (e.g., with dual-partitioning therefore as known in the art).

Figure 1:
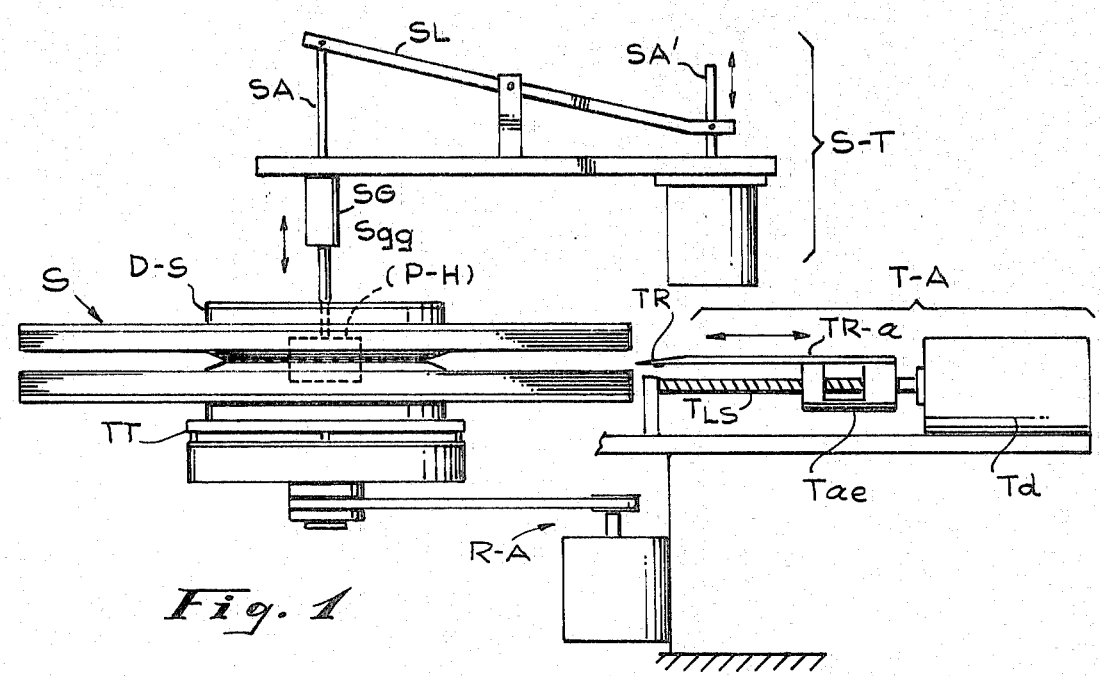
FIG. 1 is a very schematic elevation of a preferred disk stack embodiment and related transducing and partition mechanisms.

Details of preferred disk pack, etc. (FIG. 1):

FIG. 1 is a schematic, rather functional showing of a preferred form of packs P in FIG. 2. Here, a flexible disk pack S mounted on a conventional turntable TT and operatively engaged with a "partitioning" hub P-H adapted to pneumatically partition the pack for access entry of a conventional transducer mount TR, as generally understood in the art. Here, and elsewhere, the materials, mechanisms and systems alluded to should be understood as conventionally constructed and operated as presently known in the art, except where otherwise mentioned and understood as more fully described in cited U.S. Ser. No. 774,312. Pack S will be understood as apt to be conventionally engaged by rotation assembly R for prescribed high speed rotation (the "high performance" systems like those described will be understood to involve disk rotation on the order of at least several thousand rpm). This rotation assembly comprises conventional means, schematically indicated as including a turntable TT, and an associated drive R-A, including a motor, belt coupling and associated pulleys and gears, etc., as well understood in the art.

Once pack S is so engaged and so rotated, it is ready for transducer operations on a selected disk, access to which (by transducer TR, as known in the art) is best facilitated by a "partitioning", i.e., a separation between disks sufficient to expose the selected disk surface, at least partly, so as to accommodate entry of the transducer mount. Here, and elsewhere, it will be indicated that flexible disk packs like those described, are particularly apt for "pneumatic" partitioning, preferably from a central source partitioning means, like hub P-H which generates a partitioning jet. (P-H in phantom).

As further described in cited U.S. Ser. No. 774,312, hub P-H comprises a hollow cylinder adapted to be inserted and axially thrust down by precision actuation arrangement S-T, into the hollow center of the disk pack—the axial position of P-H determining where stack S is partitioned. Suitable hub positioning systems, for very precisely injecting such a cylinder into a disk pack and re-positioning it very quickly and accurately will be contemplated and understood by those skilled in the art and need not be depicted or detailed here.

The transducer and actuating means may be provided as well known in the art and need not be detailed here. By way of example only, an actuation drive motor $T_d$ is indicated as coupled to rotate a lead screw $T_{LS}$ on which the head mounting arm is mounted, being threadably engaged therewith via arm-extension $T_{ae}$ for precise translation into the pack (e.g., to access specific tracks on a selected magnetic disk surface, as is well known in the art and need not be detailed here).

Preferably, and according to a related optional feature, each independent lateral transport (track-select) mechanism (r) is made faster-accelerating (reduced mass) by decoupling it from the heavy mounting arm suspension, and vertical transport mechanism, etc., (e.g., decoupling tiny head TR in FIG. 1 from its support arm TR-a, etc.). Obviously, this is a radical reduction in the mass of the head-load and allows it to be laterally accelerated much faster, of course (e.g., for Fine-Servoing).

Workers will recognize the problems inherent in translating each, relatively ponderous, transducer/transport array vertically up and down the axial length of a relatively long disk pack and the associated time lost. Thus, any savings in axial (vertical) transport can, of course, result in reduced overall system access time. And, shortened stacks decrease effective pack-length and reduce actuator excursion (vertical transport distance). Conversely, increasing disk pack length can have a devastating effect upon access time. Thus, workers will appreciate that, instead of mounting the several thousand disks of data modules P-i, P-ii along one axial length, on a common spindle, the pack has been, effectively, "halved"—with consequent reduction in related access time. This "halving" together with "pairing" of the short stacks, also facilitates access by "shared" actuators, pivoting between the two half-packs so formed—and further reducing access-time.

The control and accessory elements for unit 40 will be understood as otherwise conventional—e.g., the Read/Write electronics; the disk-select servo; the track-position (and centering) servo; the supervisory controls; the interface electronics; and the diagnostic electronics, as well as associated air system, power supply, etc. The device will be recognized as highly cost-effective (cost vs. performance), especially relative to its volumetric storage capacity vs. cost. For instance, such apparatus like that shown preferably uses relatively "short" stacks—for faster actuator access—e.g., here about 10 inches long with about 8 effective inches of disk storage along each stack axis, able to provide several dozen billion bytes of data storage (e.g., six B-B in each pack, assuming about 10 MB per surface and 2 bytes per running axial inch). This assumes disk rotation speed of about 3600 rpm and disks with bit density on the order of 5000 bits per inch, track density on the order of 300 tracks per inch, with about 1000 disks in each pack. Very rapid, efficient data transfer may be accomplished; e.g., a transfer rate on the order of 8 Mhz, or 1 MB per second, with about 100 ms or less average time to data (or average time to "second file"—and about 200–300 ms seconds average time to "first file"). Workers should be impressed with this level of performance.

Figure 4:
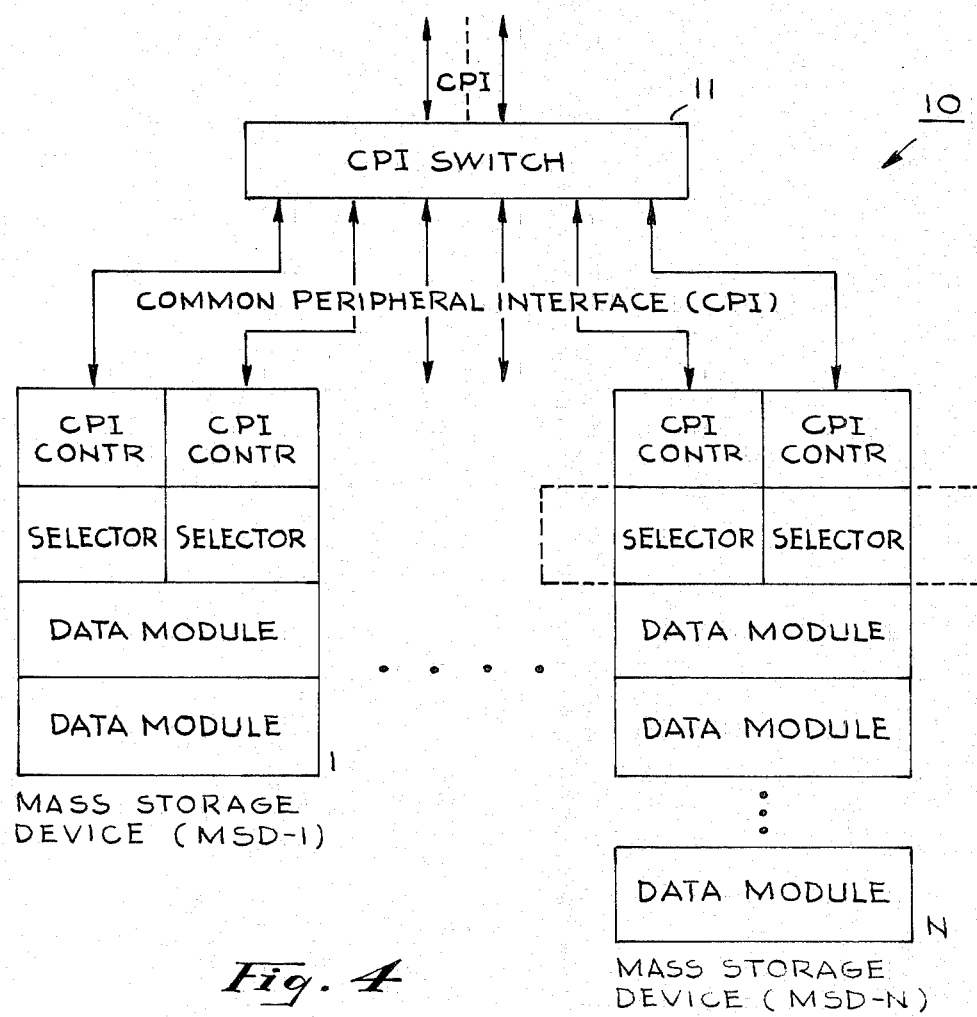
FIG. 4 indicates a preferred mode of using embodiments like that of FIG. 2.

Use of MS embodiment (FIG. 4):

FIG. 4 very generally and schematically indicates how several "paired-module" mass store units (e.g., MSD-1 through MSD-n) may preferably be integrated with a total mass store system. The units MSD-1, etc., comprise a novel improved MS memory 10 implemented as described above. Here, it will be assumed that the overall MS system will store on the order of 10 billion bytes. This corresponds to about 25 (n=25) fully-loaded, dual-spindle paired floppy disk memory units (vs. an equivalent of about 2500 normally-loaded tape reels, assuming an average data-set of about four megabytes per reel—Note: tape libraries of 10 thousand tape reels or more are not uncommon). Each unit MSD comprises a pair of removeable stacks, or module packages, of flexible disks (each stack called a "data module") and two associated "shared" actuator devices as described above. As indicated above, each selector can access either stack; or both access one stack—e.g., affording "backup" in the event of failure of either selector. Preferably, two CPI controllers are also associated with each MSD; these permitting an "overlap and seek" function, with up to twice the data transfer rate.

In system 10, the mass storage devices MSD will be recognized as integrated into a conventional computer system via a CPI-switch of a known type and a CPI (Common Peripheral Interface) between the CPI-switch stage 11 and each pair of CPI controllers with respective selectors. With this flexibility of selector and controller operations, Memory 10 is in essence, limited only by the number of CPI channels on the CPU side of switch 11.

In this fashion, the overall mass store system can be arranged to store enough intelligence for detailed monitoring of its own performance, as well as for staging (transfering) data, autonomously—on command from the host CPU—from any one data module to any other data module. This flexibility of data movement will be recognized as uniquely superior. The CPI devices postulated will be recognized as also enabling distributed, concurrent network processing at the peripheral level.

Workers will recognize the merits of this novel system. The total amount of data transfer by a system will be recognized as a measure of its "throughput", while the "time-to-access data" is a measure of the systems's "responsiveness". The indicated system 10 will be seen as exhibiting very favorable throughput and responsiveness. For instance, Memory 10 may be integrated with, and connectible to, a known central processor (e.g., the Burroughs System B 1860 CPU), together with a related known CPI "host-line control processor" and other related memory units, such as a known fixed disk memory cluster (e.g., one or several Burroughs type 206 fixed disk drives). All memory stages will be understood as provided with common input/output CPI controllers. Such a mass store system will be recognized as an example of network use of CPI techniques, something which radically simplifies data movement from one memory unit to another, without having to first "stage into" the working memory of a CPU. Such advantageous data manipulation, through memory and bypassing the associated CPU will be recognized as very advantageous in the art; further it will be seen implemented at relatively low cost in the described embodiments because of the peripheral intelligence and the simplified switching inherent in the indicated CPI technique.

Inter-memory transfer:

Also, here it will be recognized how useful it is to stage data from a MS unit to a higher performance memory like a disk file. With this CPI function, such "direct" data transfer from one memory to another is initiated simply by the host processor—with no "staging", no intervention of a CPU control, etc. Of course, workers are aware of how data is presently staged from a low cost memory, such as archival magnetic tape, to a disk unit for processing. The more direct transfer contemplated here also affords a reduction of personnel costs, in favor of automated operation. The transfer of data from either type memory, or from both concurrently, to the CPU is also feasible [Note: "SPOOL-ing", or Simultaneous Peripheral Operation On-Line, of data concurrently from the CPU to two types of memory].

Figure 5:
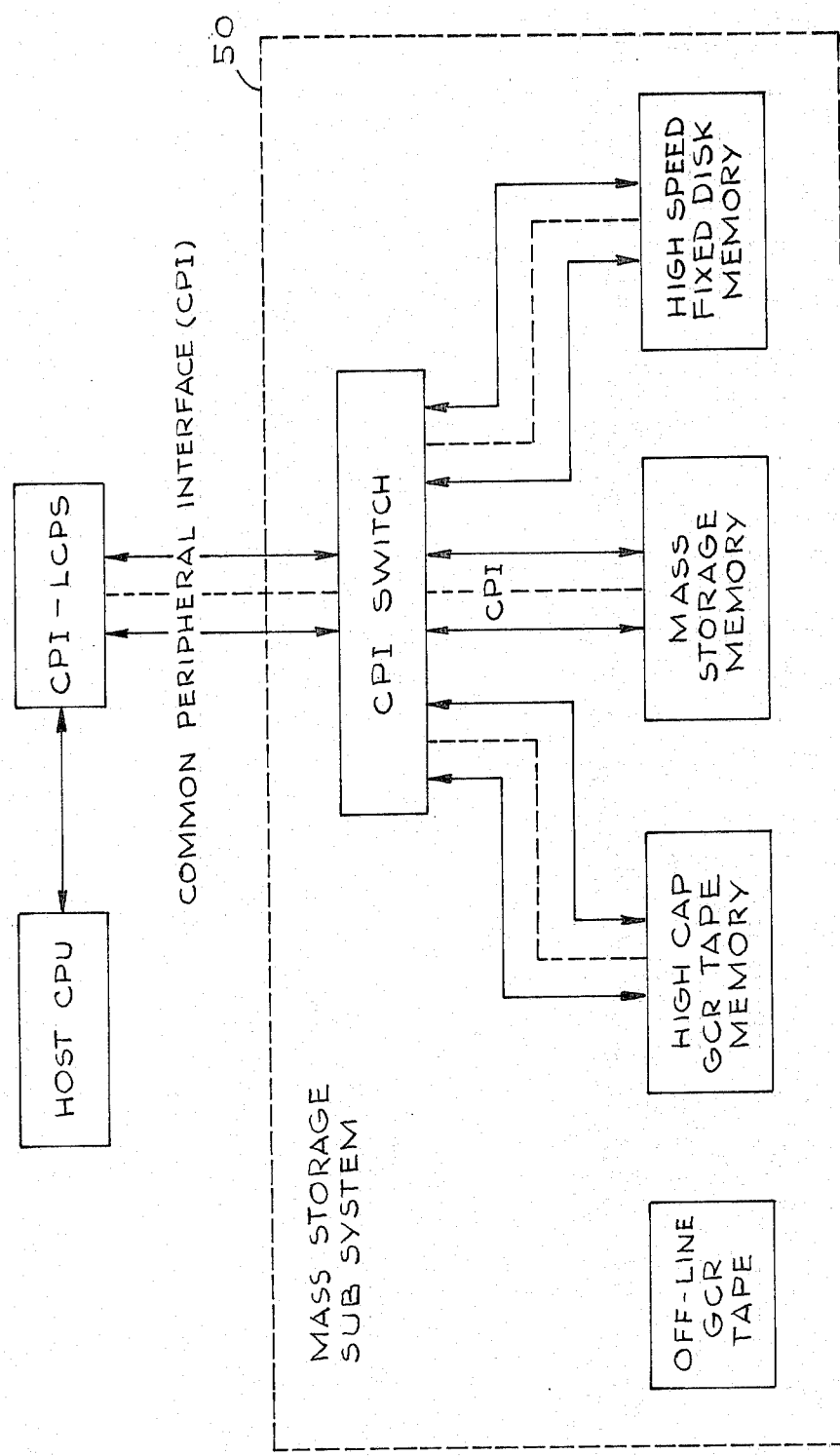
FIG. 5 is a like diagram indicating combination of such an embodiment with other memory units, as does FIG. 6.

FIG. 5 is a schematic diagram indicating the functional content of a mass store/subsystem 50 comprising a mass store memory stage MS according to the invention combined with other related conventional memory units; namely a high capacity GCR tape memory, an off-line GCR tape memory and a high speed fixed disk memory. All memory stages will be understood as integrated into a mass storage subsystem through a second-level CPI switch. This arrangement will point up some powerful system capabilities. Here, any memory can stage to any other memory, or to its host,—bi-directionally—and do so in an autonomous manner, once initiated by a host CPU. Workers will recognize that the cost/performance merits of such a system will compare very favorably with what is now available in the art. This is particularly so if one compares it with staging data-sets in a comparable conventional system—e.g., compare the number of tape transports needed and the performance thereof, (e.g., reel mountings per hour per selection; and data-set throughput) as well as the dollar cost per system, with the indicated embodiment.

Figure 6:
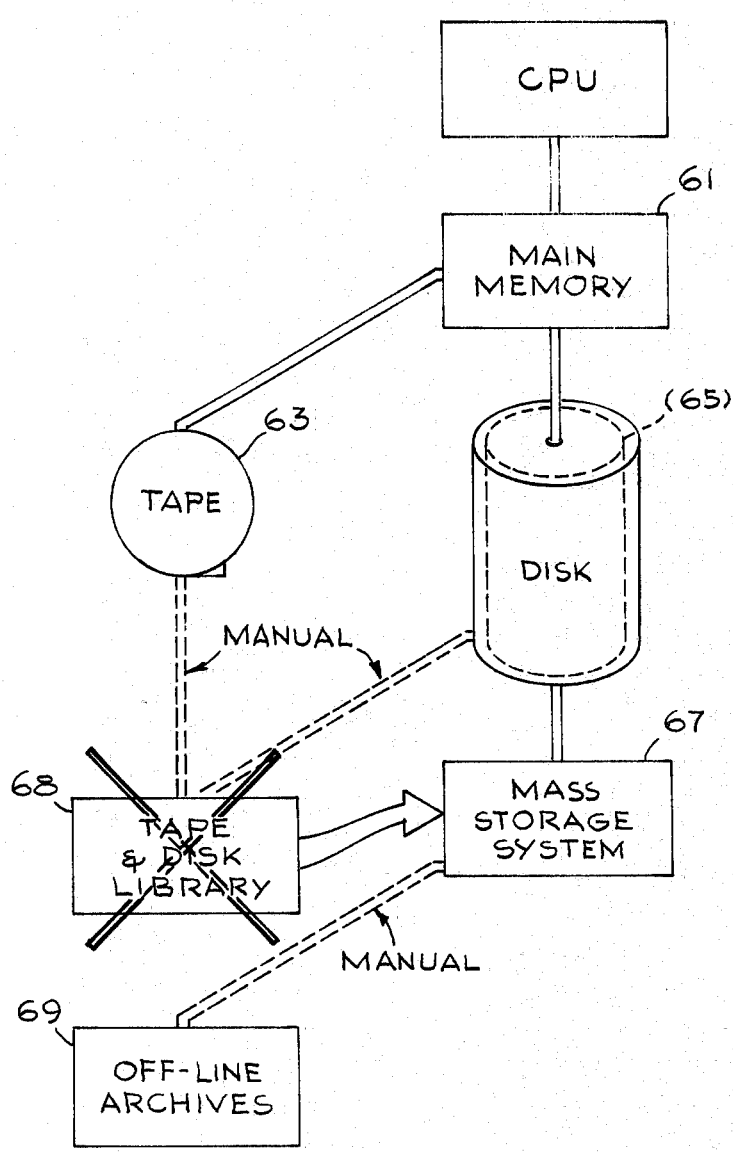

Mass store replacing tape/disk library:

FIG. 6 is a schematic functional diagrammatic illustration of how a mass store system here 3can modify the configuration of a more conventional computer memory array. In this conventional array, the CPU will be understood as communicating with a main memory array 61, which in turn is communicated with by a tape array 63 and a disk array 65 (shown in phantom as being subject to elimination by the invention). Conventionally disk array 65 may be used to stage data into, and out of, main memory 61 (being about 10% to 0.1% as costly as 61 but about $10^3 \times$ larger and 0.1% as fast). Conventionally a supplemental library of tape and/or disk files 68 may be accessed to be manually coupled to either the tape array 63 or the disk array 65, as workers well know.

As the diagram in FIG. 6 indicates, a mass store system 67 contemplated according to the invention can eliminate such a library 68 and provide a more practical cost-effective memory substitute. As an added optional feature this mass store system may be designed to comprise the fast-access, direct-access type mentioned, communicating directly with CPU memory 61 and eliminating the need for intervening disk staging unit 65. Such a mass store system will be relatively large, fast and inexpensive (e.g., one-tenth the price per bit of the disk memory, but about one-tenth as fast, having capacity on the order of 1 billion bits or more). The mass store array 67 would also preferably be arranged to be coupled to off-like, archival memory units from an archival library 69 (with operator intervention, of course).

Shortcomings of tape:

While tape is well known and accepted as a reliable high volume data storage medium, well suited for situations where large, sequential input/output streams are acceptable (e.g., archive media) it has certain shortcomings as a "mass store" medium as workers know. For instance, tape is relatively expensive and slow to handle (i.e. labor intensive with most steps requiring the intervention of an operator) and must typically be handled in "batch mode" (see cf. sequential input/output). And its access time is typically much too long. Also, it is difficult to use multiple data-sets per tape reel; "concurrent sharing" is not feasible; physical security is always a question (e.g., lost or misplaced reels) and tape is inefficient for small data-sets. Also, it is not easy to update and/or to increment a tape file, and with data files increasing in size each year, tape is simply not the answer to most mass store problems.

Typical mass store requirements:

Besides the usual gross requirements, the instant objectives for mass store memory are that it be relatively low cost (dollars per MB, on-line and off-line), have fast access with high throughput, be relatively compact (MB/ft$^2$) with a large memory capacity, as well as easy to increment and update and have a multiple data sharing capability (stage-to-disk), use convenient and reliable technology (simple, well designed, maintainable equipment with redundancy) and present no security problem. Workers will appreciate that systems according to the invention, as described, go far toward meeting these objectives.

It will be understood that the preferred embodiments described herein are only exemplary in that the invention is capable of many modifications and variations in construction, arrangement and use without departing from the spirit of the invention; for example, the means and methods disclosed herein are also applicable to rigid disk packs or the like.

The above examples of possible variations of the present invention are merely illustrative. Accordingly the present invention is to be considered as including all possible modifications and variations coming within the scope of the invention as defined by the appended claims.

What is claimed is:

1. An improved mass store memory array comprising:
   a pair of flexible disk packs;
   a pair of like transducer assemblies, each assembly including transducer means and being arranged and adapted to position the transducer means both axially and laterally of either of said packs whereby the assemblies are "shared" by the two packs;
   each pack comprising a plurality of flexible recording disks and intermediate radially-vented separator means, these being assembled together and arranged to form a co-rotatable stack with a center-bore of prescribed length and diameter; and
   a pair of partition means, each operatively associated with a respective pack and being adapted for pneumatic disk separation and partition.

2. The combination as recited in claim 1, wherein said packs are operatively associated with pack rotation means adapted to controllingly rotate the packs at relatively high rpm.

* * * * *

UNITED STATES PATENT AND TRADEMARK OFFICE
CERTIFICATE OF CORRECTION

PATENT NO. : 4,164,767
DATED : August 14, 1979
INVENTOR(S) : Ko Ko Gyi and Herbert U. Ragle It is certified that error appears in the above-identified patent and that said Letters Patent are hereby corrected as shown below:

Col. 7, line 52, change "systems's" to --system's--.
Col. 8, line 46, after "here" insert --contemplated--; delete "3".
Col. 9, line 5, change "off-like," to --off-line,--.

Signed and Sealed this

Thirtieth Day of October 1979

[SEAL]

Attest:

RUTH C. MASON
*Attesting Officer*

LUTRELLE F. PARKER
*Acting Commissioner of Patents and Trademarks*